United States Patent
Acuna et al.

(10) Patent No.: US 10,031,980 B2
(45) Date of Patent: Jul. 24, 2018

(54) INTELLIGENT HOMEPAGE TUNING IN A WEB BROWSER

(71) Applicant: INTERNATIONAL BUSINESS MACHINES CORPORATION, Armonk, NY (US)

(72) Inventors: Jorge D. Acuna, Vail, AZ (US); Ezequiel Cervantes, Tucson, AZ (US); Nedzad Taljanovic, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 173 days.

(21) Appl. No.: 14/683,781

(22) Filed: Apr. 10, 2015

(65) Prior Publication Data

US 2016/0299912 A1    Oct. 13, 2016

(51) Int. Cl.
*G06F 15/173* (2006.01)
*G06F 17/30* (2006.01)
*H04L 12/26* (2006.01)
*H04L 29/08* (2006.01)

(52) U.S. Cl.
CPC ...... *G06F 17/3089* (2013.01); *G06F 17/3053* (2013.01); *G06F 17/30876* (2013.01); *H04L 43/062* (2013.01); *H04L 43/0876* (2013.01); *H04L 67/18* (2013.01); *H04L 67/22* (2013.01); *H04L 67/02* (2013.01)

(58) Field of Classification Search
CPC ............ G06F 17/3089; G06F 17/3053; G06F 17/30876; H04L 43/062; H04L 43/0876; H04L 67/22
See application file for complete search history.

(56) References Cited

U.S. PATENT DOCUMENTS

| | | | |
|---|---|---|---|
| 6,760,046 B2 | 7/2004 | l'Anson et al. | |
| 7,035,896 B1 | 4/2006 | Schneider et al. | |
| 9,363,326 B2* | 6/2016 | Wang | G06F 17/30867 |
| 2010/0114914 A1* | 5/2010 | Gerges | H04L 67/289 |
| | | | 707/751 |
| 2011/0320957 A1* | 12/2011 | Tiddens | G06F 3/04817 |
| | | | 715/747 |
| 2013/0290862 A1 | 10/2013 | Chand et al. | |
| 2014/0244572 A1* | 8/2014 | Hill | G06F 17/3089 |
| | | | 707/603 |
| 2015/0051931 A1* | 2/2015 | Miller | G06Q 10/06311 |
| | | | 705/7.15 |
| 2015/0261844 A1* | 9/2015 | Ramalho | H04L 67/306 |
| | | | 707/749 |
| 2016/0224925 A1* | 8/2016 | Schulz | G06Q 10/06398 |
| 2016/0267520 A1* | 9/2016 | Kalish | G06Q 30/0272 |

OTHER PUBLICATIONS

Anonymous, "Dynamic display of browser home page, based upon browser history and scheduled events", Nov. 26, 2010, 3 pages, IPCOM000201843D, ip.com.

Anonymous, "Network Bandwidth & Time Based Home Page Selection", 6 pages, IPCOM000227005D, ip.com.

* cited by examiner

*Primary Examiner* — Ryan Jakovac
(74) *Attorney, Agent, or Firm* — Griffiths & Seaton PLLC

(57) ABSTRACT

Various embodiments for intelligent homepage tuning using a processor device in a computing environment. Usage patterns of website activity within a web browser are recorded. The recorded usage patterns are stored. A preferred homepage is determined and displayed within the web browser according to time and location based on the stored recorded usage patterns.

14 Claims, 4 Drawing Sheets

INTELLIGENT HOMEPAGE TUNING IN A WEB BROWSER

BACKGROUND OF THE INVENTION

Field of the Invention

The present invention relates in general to computers, and more particularly to intelligent homepage tuning in a web browser in a computing environment.

Description of the Related Art

In today's society, computer systems are commonplace. Computer systems may be found in the workplace, at home, or at school. Interconnected computing environments have led to the emergence of the World-Wide-Web (WWW) or Internet as a vehicle by which a client computer may communicate, sometimes over long distances, with a server or host computer. The client computer may implement an application, such as a browser, which is configured to transmit and interpret data received and/or sent to the server over the WWW.

SUMMARY OF THE DESCRIBED EMBODIMENTS

Various embodiments are provided for intelligent homepage tuning in a web browser, in a computing environment. In one embodiment, by way of example only, usage patterns of website activity within a web browser are recorded. The recorded usage patterns are stored. A preferred homepage within the web browser is determined according to one of a plurality of locations and one of a plurality of times based on the stored recorded usage patterns.

In addition to the foregoing exemplary method embodiment, other exemplary system and computer product embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
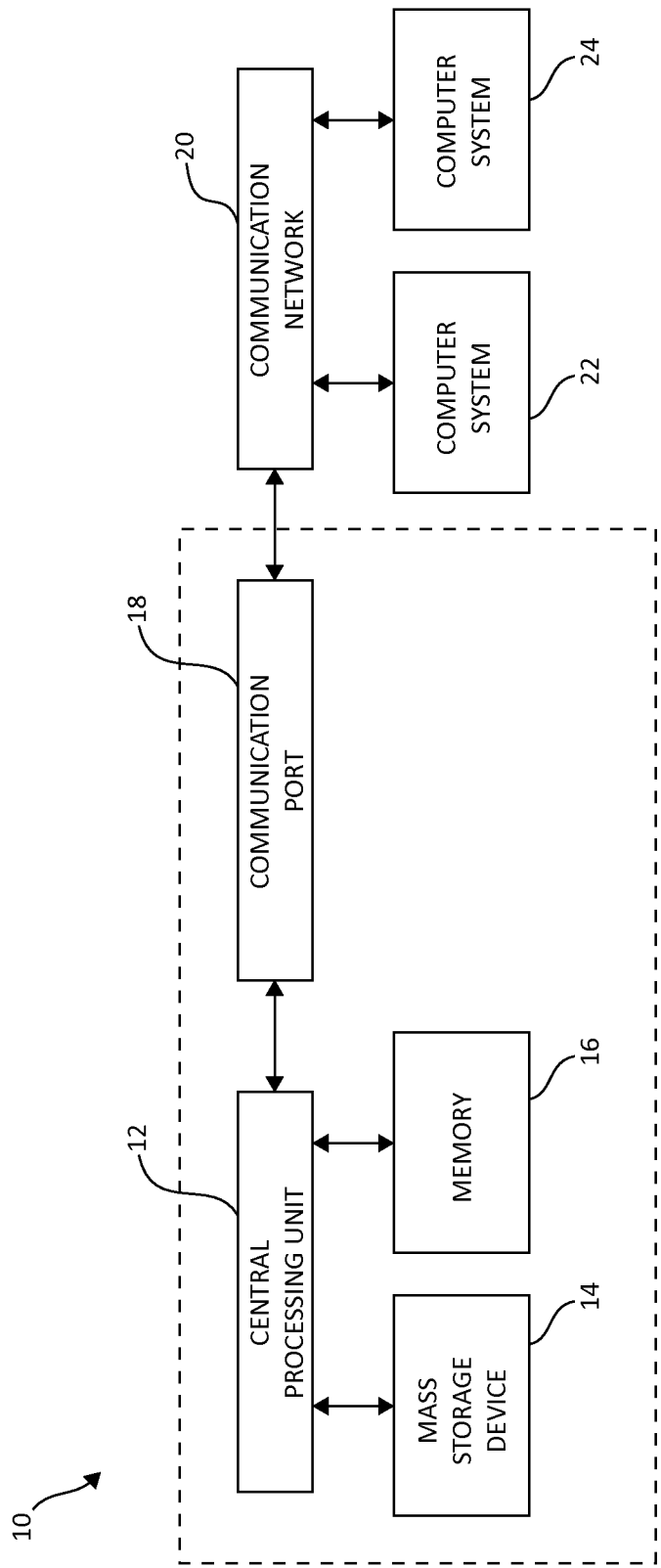
FIG. 1 is a block diagram illustrating a computing system environment having an example storage device in which aspects of the present invention may be realized.

An application program called a "browser" is used to view pages of information received from servers on a large computer network, such as the Internet. Information provided through the web browsers to and/or from clients and/or servers has become increasingly prevalent and complex. Information displayed in the browser is provided by various web sites, or servers, which are often located far from the client computer system. This information provided by the servers generally includes text, graphics, sound, video files and other data. The information is organized into electronic document files called web pages. Web pages may contain hypertext links written in a software language such as the Hypertext Mark-up Language (HTML).

Web browsers are software interfaces that run on world wide web clients to allow access to web sites via a simple user interface. A web browser allows a web client to request a particular web page by specifying a Uniform Resource Locator (URL). A URL is a web address that identifies the web page and its location on the web. A user navigates through the network by selecting a hyperlink, or label, displayed in the browser, and the browser then loads the corresponding URL and downloads the web page or other associated data from the server. A homepage can be displayed when a new browser window is launched.

Currently, a homepage that is static fails to provide a dynamically changing homepage within a web browser according to usage pattern. That is, a user may desire a different homepage according to time, location, and/or usage patterns. For example, the user may want to open a news web page set as the homepage in the morning, while later in the day the user may want to have an entertainment web page set as the homepage in the evening. Having a static homepage set does not fit such user requirements or usage patterns. What is needed, therefore, is a system and method for changing the user's home page based upon time, location, and/or usage pattern. As such, a need exists for allowing a user to view different homepage websites at different times and places according to recorded usage pattern.

As described herein, various embodiments are provided for intelligent homepage tuning in a web browser, in a computing environment. The various embodiments can include a non-transitory computer-readable medium and at least one processor in operable communication with the computer-readable medium. The processor records usage patterns of website activity within a web browser and storing the recorded usage patterns and determines a preferred homepage within the web browser according to one of a plurality of locations and one of a plurality of times based on the stored recorded usage patterns.

That is, the processor records usage patterns, and based on the stored data determine the most appropriate homepage for a given place and time. After the homepage is displayed, all user action relating to web activity is monitored. If a user spends more than a threshold amount of time on the web page set as the homepage, then an entry is recorded in the database. If the user navigates away from the web page set as the homepage before the threshold time is reached, then the next viewed page is recorded in the database.

Turning now to FIG. 1, exemplary architecture 10 of a computing system environment is depicted. The computer system 10 includes central processing unit (CPU) 12, which is connected to communication port 18 and memory device 16. The communication port 18 is in communication with a communication network 20. The communication network 20 and storage network may be configured to be in communication with server (hosts) 24 and storage systems, which may include storage devices 14. The storage systems may include hard disk drive (HDD) devices, solid-state devices (SSD) etc., which may be configured in a redundant array of independent disks (RAID). The operations as described below may be executed on storage device(s) 14, located in system 10 or elsewhere and may have multiple memory devices 16 working independently and/or in conjunction with other CPU devices 12. Memory device 16 may include such memory as electrically erasable programmable read only memory (EEPROM) or a host of related devices. Memory device 16 and storage devices 14 are connected to CPU 12 via a signal-bearing medium. In addition, CPU 12 is connected through communication port 18 to a communication network 20, having an attached plurality of additional computer host systems 24. In addition, memory device 16 and the CPU 12 may be embedded and included in each component of the computing system 10. Each storage system may also include separate and/or distinct memory devices 16 and CPU 12 that work in conjunction or as a separate memory device 16 and/or CPU 12.

Figure 2:
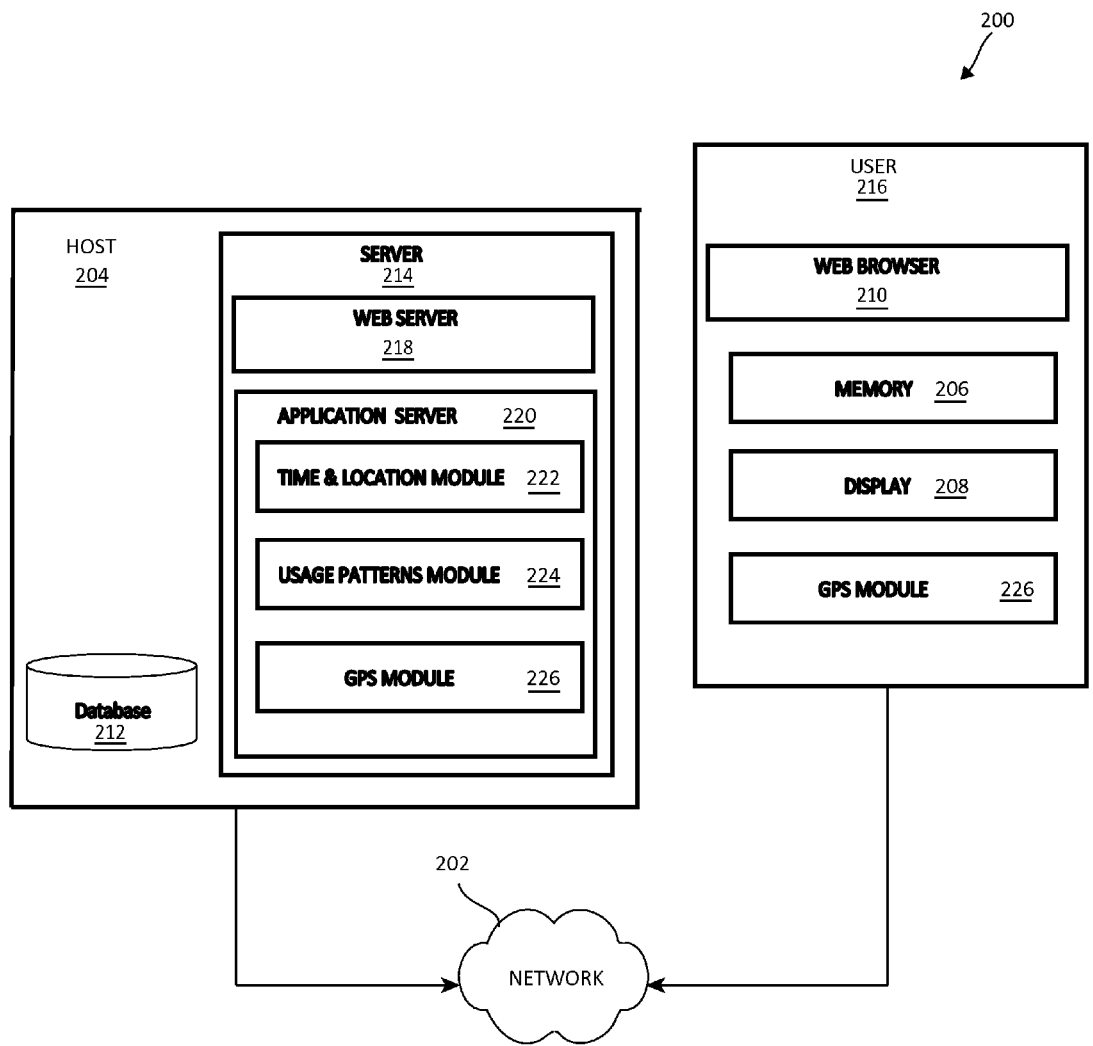
FIG. 2 is a block diagram illustrating a preferred embodiment of a computer system in which aspects of the present invention may be realized.

FIG. 2 is a block diagram illustrating a preferred embodiment of a computer system 200 in which aspects of the present invention may be realized. The computer system 200 can include a user 216, a network 202, and a host 204. The user 216 can include a web browser 210, a memory 206, a display 208, and a GPS module 226. The host 204 can include a database 212 and a server 216. The server 214 can include a web server 218 and an application server 220. The application server can include a time and location module 222, a usage patterns module 224, and an alternative GPS module 226. The user 216 and the host 204 are connected via the network 202.

In a preferred embodiment, the network 202 may be the Internet, a proprietary network or an intranet, however other networks may also be used. Alternately, in some embodiments, the host 204 and user 216 may communicate indirectly or directly without passing through the network 202. FIG. 2 shows only one example of a possible architecture and the invention is not limited to the architecture illustrated in FIG. 2.

The user 216 may be a desktop computer, a laptop computer, network computer, handheld storage devices, PDAs, cellular telephones, and/or other device capable of communicating with an Internet connection. Alternatively, the user 216 may be a stand-alone terminal designed to receive inputs used to configure any number of products. The user 216 may have a touch screen user interface or may be a conventional PC with a keyboard, mouse and display screen.

In one embodiment, the memory 206 may be random access memory used to store the source code of the web page currently displayed. The display 208 may be any commonly used display such as a computer monitor, a television screen or a touch screen.

In one embodiment, the time and location module 222 may record the time, date, and location of user and website activity. Also, GPS module 226 can determine location by any type of mechanism, such as by a global positioning system (GPS) receiver, control processor for determining the location of the mobile source based on received GPS data from GPS satellite, by a Global Navigation Satellite System (GNSS) or other satellite navigation system (that provides autonomous geo-spatial positioning with global coverage), Radio Frequency Identification Detection (RFID) (with an RFID reader and tag being used to determine device location), and Internet connectivity via a connection, such as a Wi-Fi hot spot, controlled by a resource provider. As will be appreciated, GNSS allows small electronic receivers to determine their location (longitude, latitude, and altitude) to within a few meters using time signals transmitted along a line of sight by radio from satellites. Exemplary GNSS include the NAVSTAR Global Positioning System (GPS), the Russian GLONASS, the European Union's Galileo positioning system, the Chinese regional Beidou navigation system, and India's IRNSS.

In one embodiment, geolocation data may be sent/received by the GPS module 226 on a substantially real-time basis. By a substantially real-time basis, it is meant that the geolocation data to/from the GPS module 226 is updated in approximately the same time during which the user 216 is active to ensure that the location provided for the user 216 by the GPS module 226 is very accurate at any given time, depending on conditions. For example, when a GPS module 226 detects that the user 216 is stationary, it may reduce its update frequency or the transmission of updated information in order to conserve battery life. Under different conditions, such as moving at a high rate of speed, the user 216 (e.g., a laptop or portable smartphone) may increase its update frequency in order that its location may be tracked with high accuracy, at about the same time the device is moving. Sent or received geolocation data by the GPS module 226 may be stored in the database 212.

The user 216 preferably accesses the server 214 via the web browser 210 connected to a network 202 such as the Internet, although other networks including proprietary networks and intranets may also be used. In a preferred embodiment, the client's web browsers 210 may operate in conjunction with one or more computer systems such as desktop computer, laptop computers, network computers, handheld storage devices, PDAs, cellular telephones, etc. A preferred embodiment of the present invention can be implemented in a client server environment. The Internet is one example of such a client server environment, however, any other appropriate type of client server environment, such as an intranet, a wireless network, a telephone network, etc., may also be used. The present invention is not limited to the client server model and could be implemented using any other appropriate model, for instance, an application hosting model. The described embodiment uses the worldwide web, although other protocols may also be used and other newer versions of the web may be used as well. A redirector may also be employed between the browsers and the server 214.

In one embodiment, the user 216 and the host 204 may be one device in communication with each other. That is, the host may include the user 216. In a preferred embodiment, the host 204 may have the processing capability to support communication with the user 216, to generate and send web pages to the user 216, and to receive and store information from the user 216. The database 212 can be used by the host 204 to store information, such as one or more lists and/or entries received from the user 216.

In a preferred embodiment, the server 214 generates and sends web pages via the network 202 to the user 216. In this embodiment, the web server 218 generates and sends web pages that do not require user inputs, as pages that require user inputs are sent by the application server 220. For instance, the web server 218 may send a home page or several introductory pages. The application server 220 sends pages that have been generated and such pages generally require user input. Computer readable instructions may be stored on a computer-readable medium, such as a floppy disk, CD ROM, or any other appropriate storage medium within the host and/or each module or server, such as server 214, memory 208, and database 212. The server 214 may generate and sends web pages including metadata and/or hidden form fields. The hidden form fields consist of preformatted information contained in the source code of the web page, but which is not visible to the user. The server 214 can also receive and process information from the user 216. Each of the components of FIG. 1 may also be employed and/or used in conjunction with FIG. 2.

Figure 3:
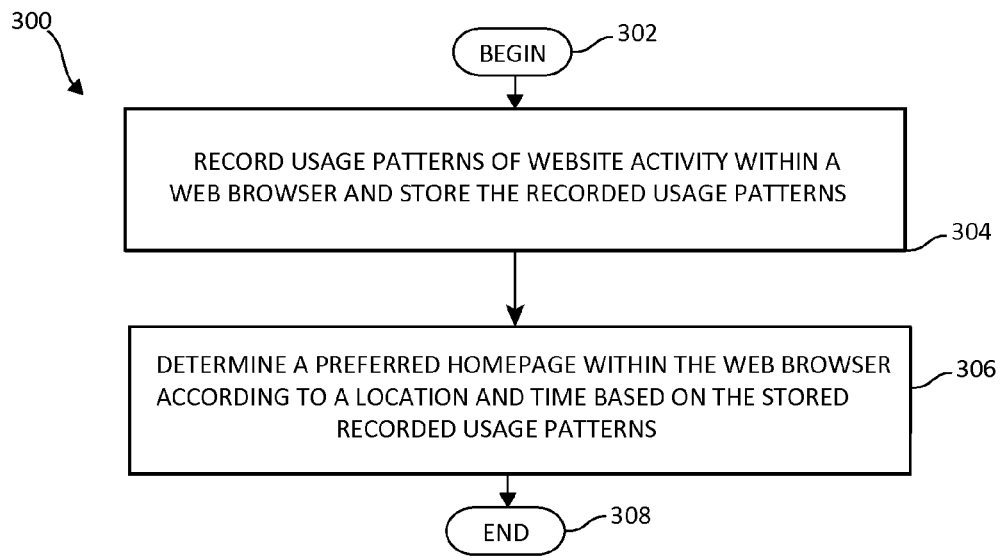
FIG. 3 is a flowchart illustrating an exemplary method for intelligent home page tuning in a web browser in which aspects of the present invention may be realized.

FIG. 3 is a flowchart illustrating an exemplary method 300 for intelligent home page tuning in a web browser in which aspects of the present invention may be realized. The method 300 begins (step 302). The method 300 includes recording usage patterns of website activity within a web browser and storing the recorded usage patterns (step 304). The method 300 includes determining a preferred homepage within the web browser according to one of a plurality of locations and one of a plurality of times based on the stored recorded usage patterns (step 306). The method 300 may end at block 308.

Thus, as described in FIG. 3, the present disclosure records usage patterns, and based on the stored data in a database, determines the most appropriate homepage for a given place and time. After the homepage is displayed, the user action can be monitored. If a user spends more than a threshold amount of time on the page on the homepage, then an entry is recorded in the database. If the user navigates away before the threshold time is reached, then the next viewed page is recorded in the database. The entries stored in the database are stored in the format of location, time, and Uniform Resource Locator (URL), such as [Location, Time, and/or URL]. The location of the entry is recorded as a GPS location. For example, this GPS location value is available from browsers capable of supporting a geolocation application interface (API), e.g., browsers capable of supporting an HTML5 geolocation API. The time can be recorded as a date timestamp. The timestamp can identify a current time and a current day. The URL can be an address of a web resource.

Figure 4:
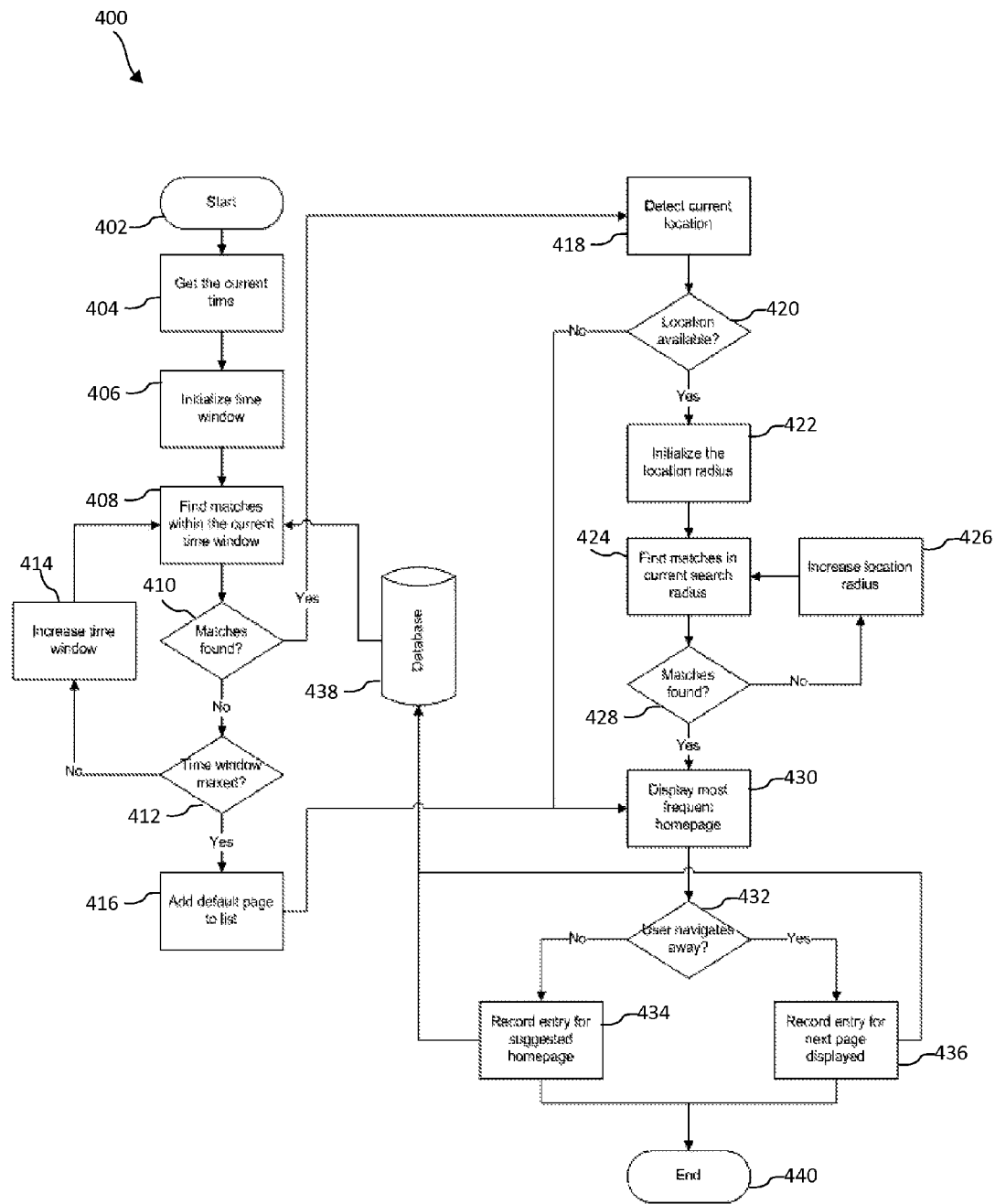
FIG. 4 is a flowchart illustrating an additional exemplary method for intelligent home page tuning in a web browser in which aspects of the present invention may be realized.

FIG. 4 is a flowchart illustrating an additional exemplary method 400 for intelligent home page tuning in a web browser in which aspects of the present invention may be realized. The method 400 begins (step 402) by obtaining the current time (step 404). The current time, for example, may be the current time of day a user opens a web browser. The method 400 initializes a time window (step 406). A search is made for matching entries stored in a database identified within the specified time window (step 408). For example, the database can be searched for entries within a specified time window, such as 30-minute period of the same day of the week. For example, if the current time is Wednesday 8:00 am, then the database would be searched for entries that fall on a Wednesday between 7:30 am and 8:30 am.

A determination is made as to whether any matching entries are located and found in the database (step 410). If matching entries are found, the method 400 moves to step 418. If no matching entries are found, a determination is made as to whether the time window is maximized (step 412). The entries identified within the time window can be later combined with the entries identified within the location radius. The combined entries can be the entries relating to the "frequency of access" entries. If the initialized time period is not maximized, the time window is increased (step 414), and the method 300, again, searches for matching entries stored in a database identified within the specified time window (step 408). If the initialized time period is maximized, a default web page is added to a list of web pages (step 416) and the method 300 then moves to step 430.

For example, if at least one matching entry is found, then the matching entry that is located in the database is added to a list of matches, such as "TemporalMatches." The matching entry can be temporal until the location of the user is determined. At this point, a home page determined to be most accurate (e.g., best home page based on location of the user) can be obtained from the temporal time list based on the location steps. The temporal match list can be the initial list found based on the time the user opened a web browser. An entry in the list can contain the time, location (which can be blank at a time if no entry in the database is found), and a home webpage.

If no matches are found, then time window is expanded (e.g., expanded as needed until reaching a maximum time period) until matches are found. It should be noted that are many ways to expand the time period. In one embodiment, the time period is expanded by first expanding the search to include all days of the week. Using the same example as above, the time period would then be between 7:30 am and 8:30 am on any day of the week. If at least one matching entry is found, then the at least one matching entry that is found is added to the list of TemporalMatches. If still no results are found, then the time window can be expanded by 30 minutes on each side (e.g., either side of 7:30 am and 8:30 am) and the process is repeated until reaching a maximum time period, such as a defined time and date. In the first iteration the window may be 7:00 am to 9:00 am. As soon as a result is found, the search stops and the found entries are added to the list of TemporalMatches. Reaching a time window that represents a full day can also terminate the search.

Returning back to step 418, the method 300 detects a current location (step 418). A determination is made as to whether the current location is available (step 420). The time and location can refer to the location of the user, such as the location of a smart phone used by the user. That is, the current location and time or the current location of a web page can be obtained for the location of a user (such as a smart phone). Also, a GPS locator can be trying to establish the location, however, the GPS may or may not be able to detect the location at step 420.

If no, the method 300 then moves to step 430. If yes, the current location radius is initialized (step 422). A search is made for matching entries stored in a database identified within the current location (step 424). A determination is made as to whether any matching entries are located and found (step 428). If no matching entries are found, the radius of the current location is increased (step 426). If matching entries are found, the method 400 moves to step 430.

For example, in one embodiment, if the TemporalMatches list is empty, a default home page may be added to a list of matching locations (e.g., LocationMatches or LocationMatches list). It should be noted that the difference between temporal matches list (e.g., temporalmatches) and location matches lists (e.g., locationmatches) is that the temporal match list is an initial list found in the database and/or can be newly created entries on the temporal match list itself based on time the user opened the browser. The location matches list can be a list of temporal matches entries that match the location where the user is located. An entry in each list may contain time, location, home webpage, and/or rank.

The default homepage can be a blank page or a user configured page. If the TemporalMatches list is not empty then the current location is detected. If the current location is not available, then add all items from TemporalMatches to LocationMatches. If the current location is available, a determination is made to identify the most relevant matches in terms of location. For example, a radius of 1 mile may first be searched. In the TemporalMatches list, the results within the current radius are searched. If no matches are found in the TemporalMatches list, then the radius can be increased (e.g., 2 miles, 3 miles, and so forth) until a match is found. There are many approaches to increase the radius of the current location. For example, in one embodiment, the radius can be multiplied by a factor of 2 and iterate. As soon as one entry in the TemporalMatches list is found within a radius, then those entries that are located are added in the LocationMatches list.

At step 430, the most frequently accessed web page is displayed. For example, within the LocationMatches list, each URL is ranked by the frequency. That is, those URLs that are more frequently accessed are ranked higher and those URLs that are less frequently accessed are ranked lower. The most frequently accessed URL (e.g., the highest ranked URL) is determined to be the preferred homepage and is display as the homepage. In one embodiment, multiple frequently used homepages can be displayed and opened as tabs within the browser. In another embodiment, multiple homepages can be displayed on one window such that they are all visible. In one embodiment a process removes database entries that are older than a configurable threshold (1 month by default). By way of explanation for each of the lists, how and what entries the lists contain, and how the lists interact, a database can be considered as a master static list. The database can contain all entries that have been put into the database at all times. The temporal match list and location match lists can be temporary lists that can be generated based on steps used to acquire the data needed to populate an entry in the database. The "entries" in the database and the lists can contain, but are not limited to the following elements: 1) time, 2) location, 3) home webpage, and/or 4) rank. In one embodiment, the reason that the database and/or the lists are not limited to 1) time, 2) location, 3) home webpage, and/or 4) rank mentioned is because more can be added based on the different embodiments and/or user preferences.

The method 400 includes determining if a user navigates away from the homepage (step 432). If yes, an entry is recorded for the next, subsequent web page that is displayed (step 436). If no, an entry is recorded for a suggested webpage as the preferred home page (step 434) and stored in a database (step 438). The method 400 may end (step 440).

In one embodiment, the present disclosure provides for an improved method, system, and computer program product for intelligent homepage tuning using a processor device in a computing environment. Usage patterns of website activity within a web browser are recorded. The recorded usage patterns are stored. A preferred homepage is determined and displayed within the web browser according to time and location based on the stored recorded usage patterns.

In one embodiment, processor device monitors the usage patterns of website activity within the web browser and storing the recorded usage patterns for each of the plurality of locations and times and/or monitors that the usage patterns of the website activity following the displaying of the preferred homepage. In one embodiment, processor device determines and displays the preferred homepage within the web browser according to a specified time and a specified location.

In one embodiment, processor device processor device records, in a database, an entry for a web page exceeding a threshold amount of time if a user spends more than the threshold amount of time on the web page, and records, in the database, an entry for a web page that does not exceed the threshold amount of time if the user navigates away from the web page prior to reaching the threshold amount of time, and/or records a location and a time stamp for each web page within the web browser.

In one embodiment, processor device determines the preferred homepage within the web browser by detecting a current time, identifying web page entries in a database within a specified time period, detecting a current location, identifying web page entries within the current location in the database, ranking each of the web page entries according frequency of access, wherein those web pages having a greater frequency of access are ranked higher while those web pages having a lesser frequency of access are ranked lower, and displaying as the preferred homepage within the web browser the web page having the highest ranking.

The present disclosure is automated process for detecting home pages as well being able maintain and track changes as the usage patterns change. Also the time and distance ranges are dynamic (increasing time window and distance radius) which allows for a more powerful solution. For example, time ranges of the present invention are dynamically adjusted without time ranges having to be manually defined. That is, time ranges may be automatically detected and dynamically increasing. The time ranges may be adapted with changing usage patterns.

Also, the present disclosure consults location data for detecting usage patterns to determine what homepage may be appropriate at which time, and detect suggestion "misses" when a user navigates away from the suggestion thus offer multiple homepages depending on if sufficient matches are found for multiple URLs.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for intelligent homepage tuning using a processor device in a computing environment, the method comprising:

recording usage patterns of website activity within a web browser including user visits to each one of a plurality of web pages, and storing the recorded usage patterns;

determining a preferred homepage within the web browser comprising one of the plurality of web pages according to one of a plurality of locations and one of a plurality of times based on the stored recorded usage patterns;

recording, in a database, an entry for a web page exceeding a threshold amount of time if a user spends more than the threshold amount of time on the web page; and recording, in the database, an entry for a web page that does not exceed the threshold amount of time if the user navigates away from the web page prior to reaching the threshold amount of time; wherein the preferred homepage within the web browser is further determined by:

detecting a current time by the web browser, identifying web page entries in the database within a specified previous time period commensurate with the current time, detecting a current location by the web browser, identifying web page entries within the current location in the database, the web page entries identified based on previous visits to the web pages associated with the web page entries visited at the current location, ranking each of the web page entries according frequency of access, wherein those web pages having a greater frequency of access are ranked higher while those web pages having a lesser frequency of access are ranked lower, and displaying as the preferred homepage within the web browser the web page comprising the one of the plurality of web pages having the highest ranking according to the frequency of access in addition to the web page being identified as a match to one of the plurality of web page entries in the database at the current time and the current location when compared to the web page entries in the database within the specified previous time and the previous visits at the current location.

2. The method of claim 1, further including monitoring the usage patterns of website activity within the web browser and storing the recorded usage patterns for each of the plurality of locations and times.

3. The method of claim 1, further including monitoring the usage patterns of the website activity following the determining of the preferred homepage.

4. The method of claim 1, further including displaying the preferred homepage within the web browser according to a specified time and a specified location.

5. The method of claim 1, further including recording a location and a timestamp for each web page within the web browser.

6. A system for intelligent homepage tuning in a computing environment, the system comprising:
at least one processor device operable in the computing environment, wherein the at least one processor device:
records usage patterns of website activity within a web browser including user visits to each one of a plurality of web pages, and storing the recorded usage patterns,
determines a preferred homepage within the web browser comprising one of the plurality of web pages according to one of a plurality of locations and one of a plurality of times based on the stored recorded usage patterns,
records, in a database, an entry for a web page exceeding a threshold amount of time if a user spends more than the threshold amount of time on the web page, and
records, in the database, an entry for a web page that does not exceed the threshold amount of time if the user navigates away from the web page prior to reaching the threshold amount of time; wherein the preferred homepage within the web browser is further determined by:
detecting a current time by the web browser,
identifying web page entries in the database within a specified previous time period commensurate with the current time,
detecting a current location by the web browser,
identifying web page entries within the current location in the database, the web page entries identified based on previous visits to the web pages associated with the web page entries visited at the current location,
ranking each of the web page entries according frequency of access, wherein those web pages having a greater frequency of access are ranked higher while those web pages having a lesser frequency of access are ranked lower, and
displaying as the preferred homepage within the web browser the web page comprising the one of the plurality of web pages having the highest ranking according to the frequency of access in addition to the web page being identified as a match to one of the plurality of web page entries in the database at the current time and the current location when compared to the web page entries in the database within the specified previous time and the previous visits at the current location.

7. The system of claim 6, wherein the at least one processor device monitors the usage patterns of website activity within the web browser and storing the recorded usage patterns for each of the plurality of locations and times.

8. The system of claim 6, wherein the at least one processor device monitors the usage patterns of the website activity following the determining of the preferred homepage.

9. The system of claim 6, wherein the at least one processor device displays the preferred homepage within the web browser according to a specified time and a specified location.

10. The system of claim 6, further including a global positioning satellite module in communication with the at least one processor device, wherein the global positioning satellite module and the at least one processor device records a location and a timestamp for each web page within the web browser.

11. A computer program product for intelligent homepage tuning using a processor device, the computer program product comprising a non-transitory computer-readable storage medium having computer-readable program code portions stored therein, the computer-readable program code portions comprising:
an executable portion that records usage patterns of website activity within a web browser including user visits to each one of a plurality of web pages, and storing the recorded usage patterns;
an executable portion that determines a preferred homepage within the web browser comprising one of the plurality of web pages according to one of a plurality of locations and one of a plurality of times based on the stored recorded usage patterns;
an executable portion that records, in a database, an entry for a web page exceeding a threshold amount of time if a user spends more than the threshold amount of time on the web page; and
an executable portion that records, in the database, an entry for a web page that does not exceed the threshold amount of time if the user navigates away from the web page prior to reaching the threshold amount of time; wherein the preferred homepage within the web browser is further determined by:
detecting a current time by the web browser,
identifying web page entries in the database within a specified previous time period commensurate with the current time,
detecting a current location by the web browser,
identifying web page entries within the current location in the database, the web page entries identified based on previous visits to the web pages associated with the web page entries visited at the current location,
ranking each of the web page entries according frequency of access, wherein those web pages having a greater frequency of access are ranked higher while those web pages having a lesser frequency of access are ranked lower, and
displaying as the preferred homepage within the web browser the web page comprising the one of the plurality of web pages having the highest ranking according to the frequency of access in addition to the web page being identified as a match to one of the plurality of web page entries in the database at the current time and the current location when compared to the web page entries in the database within the specified previous time and the previous visits at the current location.

12. The computer program product of claim 11, further including an executable portion that:
    monitors the usage patterns of website activity within the web browser and storing the recorded usage patterns for each of the plurality of locations and times,
    monitors that the usage patterns of the website activity following the determining of the preferred homepage.

13. The computer program product of claim 11, further including an executable portion that displays the preferred homepage within the web browser for each one of the plurality of locations and times.

14. The computer program product of claim 11, further including an executable portion that records a location and a time stamp for each web page within the web browser.

* * * * *